May 19, 1964 P. S. MARTIN 3,133,524
AUTOMATIC STOCK WATERING FOUNTAIN
Filed April 16, 1962 2 Sheets-Sheet 1

INVENTOR.
P. S. MARTIN
BY
ATT'Y.

United States Patent Office 3,133,524
Patented May 19, 1964

3,133,524
AUTOMATIC STOCK WATERING FOUNTAIN
Perry S. Martin, Harrisonburg, Va., assignor to Shenandoah Equipment Company, Harrisonburg, Va.
Filed Apr. 16, 1962, Ser. No. 187,719
7 Claims. (Cl. 119—78)

This invention relates to a drinking fountain for use by various animals.

One object of the invention is to produce an improved fountain of the type set forth.

A further object is to produce an improved drinking fountain which is automatic and dependable.

A still further object is to produce a fountain which is made freeze-proof by the use of relatively little extraneous heat whereby it can be used outdoors even under severe winter conditions.

A still further object is to produce an automatic fountain which has a rapid recovery, even when the water pressure is relatively low, thereby assuring an ample supply of water at all times for all kinds and sizes of animals.

A still further object is to produce an improved anti-siphon fountain to prevent contamination of the water supply, should the water pressure fail.

A still further object is to produce an improved fountain, the operating parts of which are protected against the stresses to which the fountain may be subjected during its use by the larger farm animals, such as cows, horses, hogs, etc.

A still further object is to produce an improved fountain, some of the operating parts of which are detachably assembled whereby they may be easily dismantled and assembled, without any skill or tools so that said parts may be bodily removed from the fixed parts of the installation for cleaning and repair.

A still further object is to produce an improved fountain in which removal of the parts referred to automatically shuts off the water supply.

The full nature of the invention will be understood from the following specification and the accompanying drawings in which.

Figure 1:
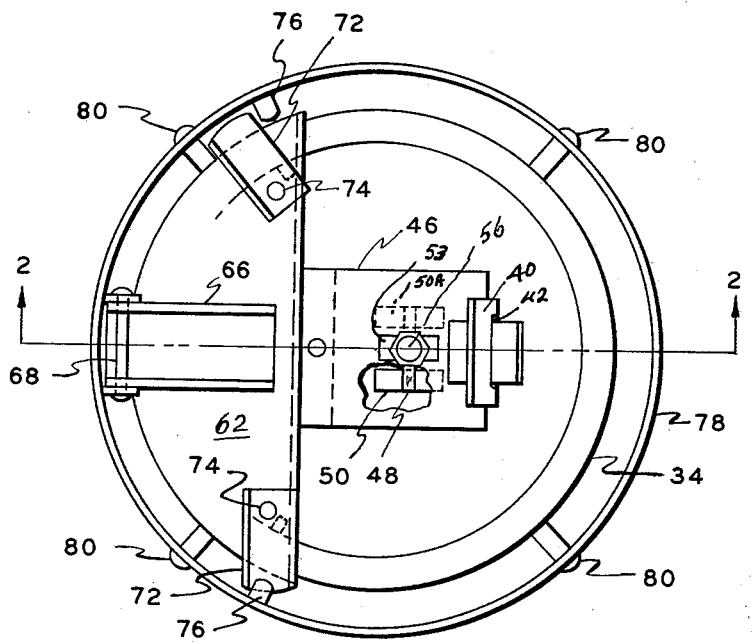
FIG. 1 is a top plan view of a stock watering fountain embodying the invention.
Figure 2:
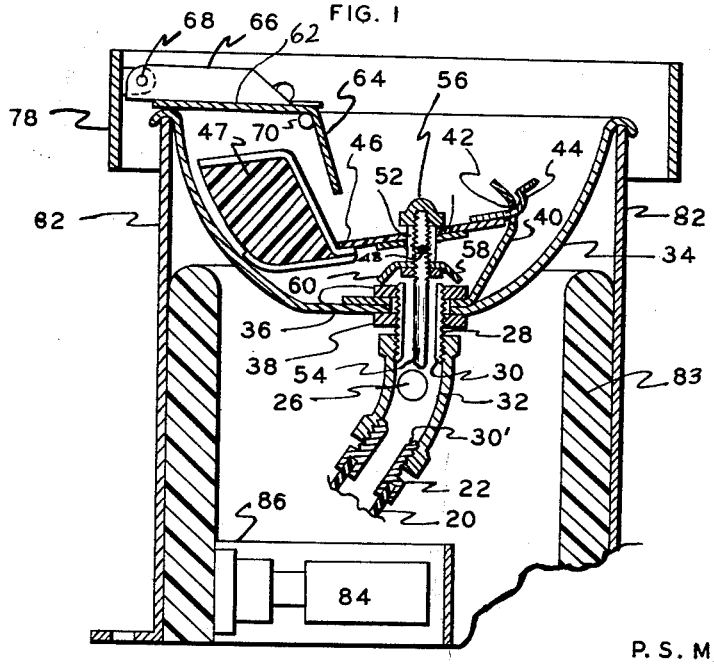
FIG. 2 is a sectional view looking in the direction of line 2—2 on FIG. 1.

A fountain embodying this invention is installed in, or on, a bed of concrete 10 which is poured around a terra-cotta casting or pipe 12 which extends into the ground and which houses a water riser 16 leading from an underground water main 14. Pipe 12 is large enough to permit manipulation of control valve 18 which connects pipe 16 to a flexible conduit 20, the upper end of which is provided with a fitting 22 which detachably internally engages one end of a coupling 32, the other end of which is detachably, internally engaged by one end of a sleeve 28. It will be noted that ends of fitting 22 and sleeve 28, which internally engage the opposite ends of coupling 32, are ground to form seats 30 and 30' which are adapted to be engaged, in a water-tight manner, by ball valve 26. The other end of sleeve 28 passes through the bottom of a bowl 34 and is clamped, in water-tight manner, by lock nuts 36 and 38, which also clamp the lower end of a bracket 40 which rises in the interior of the bowl, as best shown in FIG. 2. The upper end of bracket 40 is provided with a slot 42 which detachably engages the curved end 44 of a plate 46 which carries a float 47. To the underside of plate 46 are suitably secured plates 50 and 50-A which are disposed on opposite sides of a slot 53 formed in plate 46. Plates 50 and 50-A rotatably carry a pin 48 which is secured, by a screw, or the like, not shown, to supporting sleeve 52 which is threadedly engaged by valve stem 54. The upper end of valve stem 54 is provided with a cap 56 which is too large to pass through slot 53. By this arrangement, valve stem 54 is rotatable in slot 53 about the axis of pin 48, but is not movable, vertically, relative to plate 46. To dissipate the kinetic energy of the water flowing into the bowl through sleeve 28, valve stem 54 is provided with an inverted cup-shaped baffle 60 which is secured to the valve stem by lock nut 58.

In order to protect float 47 and to prevent accidental dislodging of the parts, I provide a cover 62 which has an inclined pendent wall 64 and which is carried by hinge plate 66 which is rotatable on hinge pin 68. In its normal, or use, position, cover 62 rests on pins 70 which are carried by bowl 34. Cover 62 is retained against accidental displacement by latches 72 which are pivoted to the cover at 74 and are engageable with keepers 76 carried by a collar 78 which also carries hinge pin 68. Collar 78 is secured, by bolts 80, to a cylindrical casing 82 which is bolted to bed 10.

Bowl 34 is detachably seated on the upper edge of casing 82 which is internally suitably insulated, as at 83. Below bowl 34 is a source of heat 84 which is supplied with energy through wire or pipe 88. Heater 84 is preferably located within a reflecting casing 86, the bottom of which is open, as shown in FIG. 2, whereby some heat is radiated directly downwardly to warm pipe 16 and whereby the heat radiated upwardly and the convective rise of the heated air serve to warm bowl 34. Since pipe 16 is below the frost line and since casing 82 is insulated, it follows that very little energy is needed to be added to the heat of the ground to protect the water in bowl 34 against freezing.

To install a fountain embodying this invention, an excavation is made for receiving pipe 12 and with the pipe 16 connected to water main 14 and with conduit 88 connected to a source of heat, and concrete, or other anchoring and sealing medium, is applied as shown in FIG. 2. Next, insulated casing 82, carrying collar 78 and cover 62, is placed over pipe 12 and anchored, also as shown in FIG. 2, or otherwise. Next, the lower end of hose 20 is connected to valve 18 and the valve is opened. It will be understood that ball valve 26 is dropped into fitting 32 before sleeve 28 is attached to the fitting and that ball valve 26 is freely movable in fitting 32, but that it can seat, in a water-tight manner, against seat 30 or seat 30'. Next, cover 62 is moved to the position of FIG. 3 and the end 44 of plate 46 is inserted through slot 42 in bracket 40 which, it will be remembered, is secured to the bowl. To insert edge 44 of plate 46, it is necessary to present the float sub-assembly at an acute angle to the bowl and, in this position, sleeve 52 and valve stem 54 pivot on pin 48 so that, as edge 44 of plate 46 enters slot 42, the lower end of valve stem 54 will enter the upper end of sleeve 28. The float sub-assembly is now lowered until it comes to rest on the bottom of the bowl, as shown in FIG. 2, and cover 62 is moved back to the position of FIG. 2, in which the float sub-assembly cannot be bodily removed from the bowl. Lowering the float sub-assembly to the bottom of the bowl 34 causes valve stem 54 to push ball valve 26 downwardly away from valve seat 30 to permit water to flow into the bowl. As the water level rises within the bowl, it lifts the float sub-assembly, including valve stem 54, accordingly. When the float rises far enough to take valve stem 54 wholly out of the way of ball valve 26, the ball valve is moved up by the water pressure to close the lower end of sleeve 28 to stop the flow of water into the bowl. Here, again, the pivotal suspension of valve stem 54 permits its free movement in sleeve 28, despite the angular movement of the float. When the water level in the bowl falls far enough, the lower end of valve stem 54 pushes ball valve off seat 30 and water will again flow into the bowl until the predetermined maximum level has again been reached. Baffle 60 prevents splashing, which can be objectionable, especially when the water pressure is high.

If the water pressure fails, ball valve 26 will come to rest against seat 30' and thus prevents syphoning of water from the bowl into the water main so as to prevent contamination.

Figure 3:
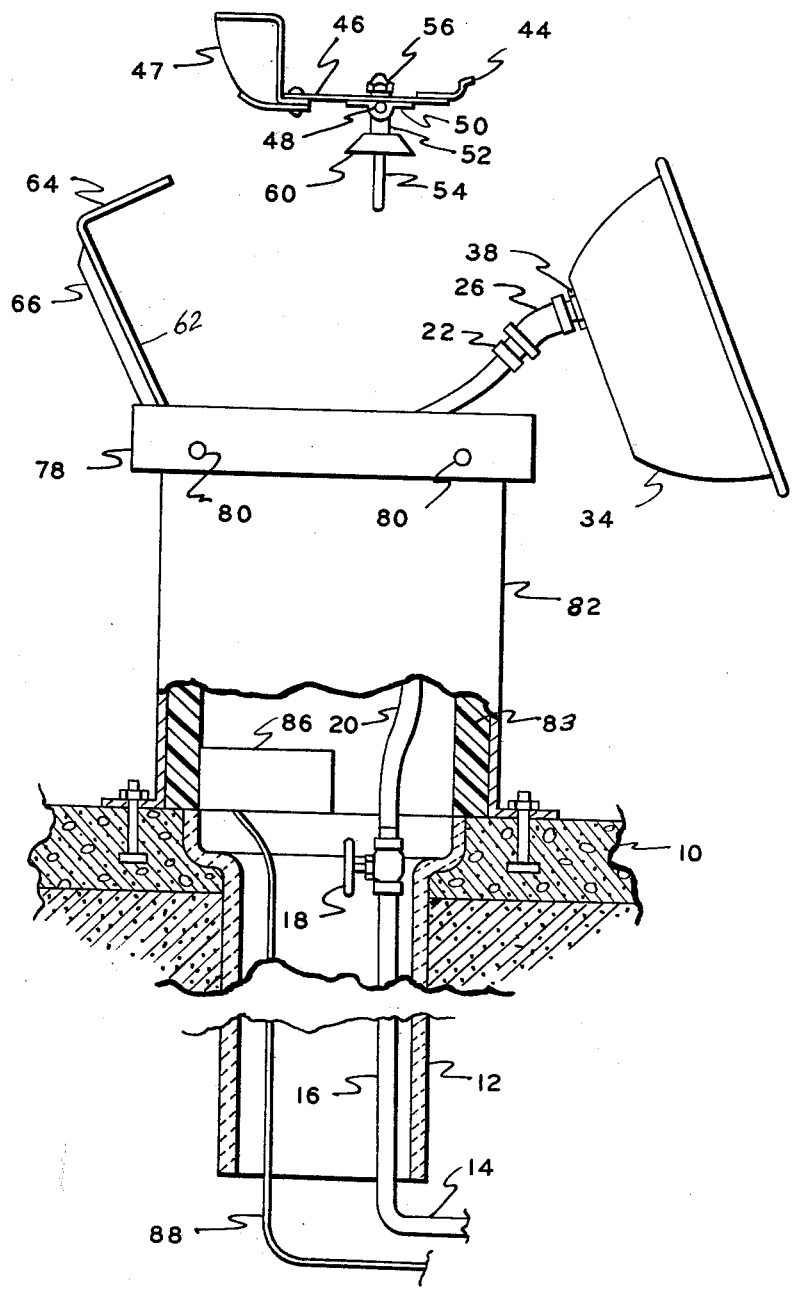
FIG. 3 is an exploded view showing how the operating component parts of the fountain can be dismantled, or removed, for cleaning and repair.

To clean the bowl and the float sub-assembly, it is merely necessary to move cover 62 to the position of FIG. 3, and then, by rotating the float sub-assembly slightly in clockwise direction, as viewed in FIGS. 2 and 3, to disengage the edge 44 of plate 46 from slot 42. It will be remembered that as the float sub-assembly is rotated, valve stem 54 pivots on pin 48 so as to remain vertical relative to sleeve 28, that is, so as not to bind. It will be seen from FIG. 3 that the float sub-assembly can be wholly detached and that flexible hose 20 is long enough to permit the bowl to be moved away from bowl supporting casing 82 to be emptied and washed without spilling or splashing into casing 82.

Pipe 16 and the connections leading into bowl 34 are generously proportioned so that when valve 18 is fully opened, the bowl will fill very quickly. It will be noted that, by adjusting the effective length of valve stem 54, the level of the water in the bowl can be controlled.

While in the drawing a single installation has been shown, it is to be understood that a number of fountains can be installed over, and connected to, a single underground pipe 14.

It will be evident that the effective height of the fountain can be varied for use by larger and smaller animals and that by merely unthreading plates or nuts 36 and 38, the bowl can be completely detached.

Since collar 78 is fastened to casing 62 which is anchored to concrete foundation 10, and since cover 62 is hinged, and latched, to collar 78, it follows that bowl 34 cannot be removed from support 82 without first moving cover 62 to its out of the way position of FIG. 3.

What I claim is:

1. An automatic fountain for watering animals, said fountain including
    a bowl,
    a valve chamber connected to a source of water under pressure and leading into said bowl,
    an upper valve seat in said chamber,
    a lower valve seat in said chamber,
    a non-floating ball located in said chamber and freely movable for engagement with either of said seats,
    a float mounted in said bowl for movement to upper and lower positions, in response to the water level in said bowl, said ball being normally moved into engagement with said upper valve seat by the water pressure in said chamber to stop the flow of water to said bowl,
    and a valve stem carried by said float and movable into and out of said chamber through said upper valve seat, to move said ball out of engagement with said upper seat and permit the flow of water into said bowl when said float is in its lower position, said ball, in the absence of pressure in said chamber, being movable by gravity, into engagement with said lower seat to prevent the flow of water from said bowl to said chamber.

2. The structure recited in claim 1 and a flexible conduit connecting said pipe to the source of water.

3. The structure recited in claim 1 and a support mounting said bowl at a given distance from said source, the length of said conduit being greater than said distance.

4. The structure recited in claim 3 in which said bowl is detachably mounted on said support.

5. The structure recited in claim 1 in which said float is detachably mounted in said bowl and said bowl is detachably connected to said pipe.

6. The structure recited in claim 5 and a latch for preventing accidental disengagement of said float from said bowl.

7. The structure recited in claim 1 and an enclosure surrounding said pipe and the bottom of said bowl and a heater in said enclosure to prevent freezing of said pipe and said bowl.

References Cited in the file of this patent
UNITED STATES PATENTS

| | | |
|---|---|---|
| 1,168,933 | Burkley | Jan. 18, 1916 |
| 1,916,513 | Jones | July 4, 1933 |
| 2,455,211 | Armstrong | Nov. 30, 1948 |
| 2,475,739 | Frank | July 12, 1949 |
| 2,479,355 | Hemker | Aug. 16, 1949 |
| 2,588,737 | Ludi | Mar. 11, 1952 |

FOREIGN PATENTS

| | | |
|---|---|---|
| 546,178 | Canada | Sept. 17, 1957 |